_[19]_ United States Patent  
Suthard et al.

[11] Patent Number: 5,546,450  
[45] Date of Patent: Aug. 13, 1996

[54] SYSTEM AND METHOD FOR PROVIDING SWITCH TRANSLATIONS

[75] Inventors: William L. Suthard, Huntingtown, Md.; Robert D. Farris, Sterling, Va.

[73] Assignee: Bell Atlantic Network Services, Inc., Arlington, Va.

[21] Appl. No.: 493,076

[22] Filed: Jun. 21, 1995

[51] Int. Cl.⁶ .................. H04M 3/26; H04M 7/06
[52] U.S. Cl. .................. 379/207; 379/9; 379/10; 379/12; 379/14; 379/15; 379/34
[58] Field of Search .................. 379/9, 10, 1, 12, 379/14, 15, 34, 201, 207, 32, 221, 220; 370/13, 14, 15

[56] References Cited

U.S. PATENT DOCUMENTS

| | | | |
|---|---|---|---|
| 4,897,866 | 1/1990 | Majmudar et al. | 379/94 |
| 4,928,304 | 5/1990 | Sakai | 379/94 |
| 4,943,998 | 7/1990 | Bauer | 379/220 |
| 5,012,511 | 4/1991 | Hanle et al. | 379/211 |
| 5,060,255 | 10/1991 | Brown | 379/211 |
| 5,151,935 | 9/1992 | Slife et al. | 379/240 |
| 5,201,045 | 4/1993 | Pflueger et al. | 379/201 |
| 5,220,596 | 6/1993 | Patel | 379/94 |
| 5,222,125 | 6/1993 | Creswell et al. | 379/67 |
| 5,268,895 | 12/1993 | Topper | 379/220 |
| 5,276,732 | 1/1994 | Stent et al. | 379/93 |
| 5,297,193 | 3/1994 | Bouix et al. | 379/63 |
| 5,311,572 | 5/1994 | Friedes et al. | 379/67 |
| 5,347,564 | 9/1994 | Davis et al. | 379/219 |
| 5,410,599 | 4/1995 | Galligan | 379/134 |
| 5,416,833 | 5/1995 | Harper et al. | 379/201 |
| 5,426,688 | 6/1995 | Anand | 379/10 |
| 5,428,679 | 6/1995 | French | 379/201 |

Primary Examiner—Jeffery Hofsass
Assistant Examiner—Parag Dharia
Attorney, Agent, or Firm—Lowe, Price, LeBlanc & Becker

[57] ABSTRACT

A method for providing switch translations upon a failure in the conventional recent change message handling system. The failure results in triggering a common channel signaling inquiry, to a signaling control point which responds with instructions for setting up a common channel signaling link between the Recent Change Memory Administration Center (RCMAC) to an alternate Remote Memory Administration System (RMAS). The RCMAC then delivers the recent change message to the alternate RMAS and the RMAS delivers the recent change signal to the addressed switch. In an alternate embodiment the Signal Control Point is provided with RMAS capability. This RMAS capability is then used in place of the alternate RMAS and the SCP sets up a path from the SCP associated RMAS to the RCMAC and to the addressed switch. The communication from the RCMAC which initiated the inquiry to the SCP and RMAS associated therewith is in common channel signaling protocol. The signal from the SCP associated RMAS to the addressed switch may be either in recent change protocol or common channel signaling protocol. In the latter instance the addressed switch is provided with a protocol conversion capability to convert the CCS protocol to recent change protocol to effect the switch translation.

30 Claims, 3 Drawing Sheets

SYSTEM AND METHOD FOR PROVIDING SWITCH TRANSLATIONS

TECHNICAL FIELD

The present invention relates generally to providing switch translations Stored Program Control Switches (SPCSs) and more particularly to a system and method for providing such translations using Common Channel Signaling (CCS) in the Public Switched Telephone Network (PSTN).

BACKGROUND ART

In the operation of Public Switched Telephone Networks (PSTNs), it is presently conventional for a customer desiring a particular service to call a service office and speak to a service order writer to arrange for the installation of the service. The service order writer in turn provides to a Recent Change Memory Administration Center (RCMAC) the necessary information to format a Recent Change Message. This is manually accomplished by keying in the appropriate message to a terminal at the RCMAC. The terminal originates and generates suitable signals for transmittal to a Remote Memory Administration System (RMAS) or a MIZAR computer. RMAS and MIZAR are commercial designations which refer to computers adapted to receive and store the signals from the RCMAC terminals. The stored Recent Change signals are then delivered at the designated times to the designated SPC switches to effect changes to line and trunk translations that have not been merged with the database. The RMAS and MIZAR systems serve as interfaces between the RCMAC terminals and the individual SPC switches. Each metropolitan area is provided with at least one RCMAC center which may access several administrative systems such as MIZAR and RMAS.

The RCMAC center constitutes a Mini Maintenance Operations Center (MMOC) environment which is linked to the RMAS or MIZAR by data links by which each terminal in the RCMAC center may access the RMAS or MIZAR. The RCMAC centers are linked to the Service Orders Processor (SOP) which in essence is a business office. The RMAS/MIZAR is linked to the switches which it serves through the DataKit, which is a network switch which the RCMACs feed. The DataKit provides access to the end offices and is a combination packet switch, CO LAN switch which provides connectivity between the RMAS/MIZAR to the end offices or switches. Also, the DataKit provides connectivity between the Switching Control Center System (SCCS) switch to the end office switches.

Maintenance and administrative data are sent to the SCCS from each switching system connected to it. The control equipment provides the interface for all forms of data received from the switching systems. The Major Customer Center (MCC) data on equipment status from all connected SPCSs are displayed on indicator lamps on a wall-mounted critical indicator panel within view of SCC (Switching Control Center) personnel. In addition, a minicomputer-based control console also receives the MCC data. Using the console, a technician can operate MCC keys remotely (that is, at the SCCS).

During any day, an SPCS may generate the equivalent of a hundred or more pages of teletype messages. These data are of various types, for example, equipment status data, administrative data, diagnostic results data, data on abnormal conditions, and audit data. The SCCS computer receives them, logs them on disk, performs a number of operations on them, and takes various actions depending on the information contained in the messages. All the received data can be viewed on a workstation CRT either immediately or later, since a long-term history of the logged data is kept. In addition to viewing and analyzing the data, a technician using a workstation terminal can directly communicate with any connected SPCS and can remotely execute any command that is available locally at the SPCS. For instance, a technician at the SCC can request an SPCS to run a program to diagnose a piece of equipment, remove or restore a trunk etc.

The number of switching offices that may be connected to an SCCS depends on the size of the offices and the amount of data transmitted. Typically, about fifteen offices are connected, although it is possible to handle thirty or more offices. Typically, an SCCS may include 15–20 workstations and two or three consoles.

If an individual RMAS/MIZAR were to go down it would be possible to access the switches via the SCCS. The SCCS is a local area network which includes a computer and translates operator language to data. The RCMAC can handle only limited functions related to recent change messages in the translations, whereas the SCCS possesses a much broader functionality. The SCCS conducts maintenance as well as being capable of performing the functions of the RCMAC on a limited scale. In performing such RCMAC functions the SCCS does not possess profile information and must type one input message at a time.

The recent change translation signals from the RCMAC are stored in the RMAS/MIZAR. Depending on information contained in the recent change messages, the RMAS will release the changes at the predetermined and predirected time and in the predirected manner. While the SCCS is capable of performing the function of the RCMAC it is not suited to handling high volume of such orders and does not really constitute an acceptable backup-system. If any of the links between the RCMAC and the RMAS, the RMAS/MIZAR and the DataKit, and the DataKit and the switches goes down, a serious problem is presented.

In recent years there have been various proposals for modification of the foregoing system and methodology to address one or the other features of problems which the existing systems present.

Hanle et al. U.S. Pat. No. 5,012,511 shows a system and method for providing remote access to custom calling, special or enhanced services, and particularly to a method and system for providing remote access to control of call forwarding. This is effected by providing, at a central office serving subscriber lines, an adjunct computer system inserted between the RMAS/MIZAR and to the input channel to the switching system, rather than having the computer system emulate the terminal behind the RMAS/MIZAR system. The adjunct computer intercepts and buffers messages from the RMAS system to the switch. This provides the ability to insert high priority messages into the normal traffic stream.

Sakai U.S. Pat. No. 4,928,304 describes an electronic switching system which includes in a private branch exchange (PBX), an external computer, and individual telephone terminals. Programs necessary for standard switching functions are stored in a memory in the PBX. Programs that apply to only a portion of the individual telephone terminals, called service functions, are stored in the external computer. Alteration of the various service functions is accomplished application programs in the external computer, thus avoiding the need to alter programs in the PBX when individual terminals need changes.

Bauer U.S. Pat. No. 4,943,998 describes a system of monitoring a communication network wherein each switch (exchange) includes a terminal module which is callable and capable of calling like a subscriber and which stores data about traffic and the switch (exchange) operation, and an internal interface. A portable operating station can connect to the interface at any switch or exchange of the network and call every terminal module over the communication lines to determine the network topology and condition.

Majmudar et al. U.S. Pat. No. 4,897,866 describes an arrangement for providing a subscriber with a CPE computer with which the subscriber may configure his own service profile. The central office downloads to the computer software packages corresponding to each of the possible combinations of features to be selected by the subscriber, and in response to the input of the subscriber to the computer transmits to the switching system commands defining the desired actions.

Slife et al. U.S. Pat. No. 5,151,935 describes the provision of special service signaling applications within a telephone network by replacing separate and unique special service signaling circuits with a programmable universal signaling circuit.

Pflueger et al. U.S. Pat. No. 5,201,045 describes distribution of an operating program stored in a common memory area of a digital telephone system. The operating program data from the common memory is transmitted via a control/database to remotely digital facility test card (DFTC 19) which in turn stores the program data in a RAM. The RAM program data is transmitted to each of the digital telephone system controllers via the PCM network connection.

Patel U.S. Pat. No. 5,220,596 relates to a phone mail (voice mail) network and to a system for automatically propagating subscriber network profiles to the databases of selected remote sites.

Creswell et al. U.S. Pat. No. 5,222,125 describes a system for providing a Personalized Calling Service Telephone Number that "travels" with the user as he/she relocates from one location to another. The subscriber can interact with the adjunct 50 and customize his associated record to invoke particular calling features or to change the values of one or more of the assigned Caller Identification Numbers (CIN). Call forwarding can also be programmed. Communications between one adjunct 150 and another adjunct 150 may be established via data bridge 45 connected to bus 15 and WAN represented by path 46, in order to change the subscriber record.

Friedes et al. U.S. Pat. No. 5,311,572 describes a system for processing a database-queried call using the call processing capabilities of a carrier's database and a subscriber's database as part of a total communication switching system. Generally, origination information such as ANI, dialed number and caller entered information are forwarded by the originating switch to the carrier's database which sends them to the subscriber's database. The latter uses prestored programs and callers' related information to formulate a processing label for the call. The processing label is comprised of (i) a routing label which provides input to the carrier's database to select a destination number for the call, (ii) an end point label which includes information to be passed to the subscriber's premise equipment, and (iii) a billing information label which can be used by the originating switch to create a customized billing record for the call. If desired, the subscriber's database, upon finding that the received call origination information is insufficient to positively identify a caller, can request additional information from the caller. This allows the communication switching system to provide call-by call-routing features to subscribers without subjecting all callers to post-dial delay inconveniences caused by an ordinary prompting arrangement. In order to update a file of call handling resources available at all subscriber's locations, the carrier's database can send the selected destination number after the call has been completed to the subscriber's database.

DISCLOSURE OF THE INVENTION

According to the present invention it has been found that it is possible to implement changes in switch translations and to thereby define user profiles in the switch using an existing Advanced Intelligent Network (AIN). The AIN conventionally provides services based on feature logic and data located at a centralized node in the network known as a Service Control Point (SCP). Appropriately equipped switches in the network, known as Service Switching Points (SSP's), communicate with the SCP and together they provide various AIN services. The SSP knows which calls require AIN service based on characteristics of the call, such as the line it originated from or the digits that were dialed.

The process of identifying calls that require AIN processing is known as "triggering", since a particular characteristic of the call "triggers" the switch into providing AIN treatment. Once a trigger occurs, a query message is sent to the SCP asking for instructions. Based on information contained in the query message, the SCP determines which service is being requested and provides appropriate information such as routing and billing instructions that the SSP then executes to complete the call. Only the SCP "knows" which service is being performed on a particular call. The SSP simply knows how to identify calls that require AIN processing and how to execute instructions provided by the SCP. For this reason, two services that are very different from the viewpoint of the subscriber and the SCP may appear identical to the SSP since it performs the same basic functions for both.

Current program controlled switches such as the AT&T 5ESS and 1AESS and comparable switches from other manufacturers are provided with an Advanced Services Platform (ASP) which provides SSP and Network Access Point (NAP) capabilities. ASP provides service independent triggering and call processing capabilities and also supports OA&M (Operations, Administration and Maintenance). These capabilities interwork with many existing switch based features. SSP capabilities enable end offices and access tandem offices to interface with SCP databases using Common Channel Signaling 7 (CCS7) Transaction Capabilities Application Part (TCAP) protocol to implement services. These services include standard equal access multi-frequency (EAMF) and CCS7-ISDN user part (ISUP) interfaces to a network access point (NAP) switch, standard CCS7-TCAP interfaces to an SCP database, call processing triggers, non-call processing triggers such as test queries, customized announcements under the control of an SCP, such as terminating announcement or play announcement and collect digits, connection control under control of the SCP, business and residence custom services (BRCS) interworking, new terminating restrictions, ISDN interworking, notification of call termination (returned to SCP), enhancements for OA&M, and billing under control of the SCP. Further details are provided in AT&T 235-190-125 October, 1990.

According to the invention it has been found possible to effectively supplant disrupted links in the conventional system for handling recent change signals by utilizing TCAP and SS7 (common channel signal) messaging in the AIN. This is advantageously accomplished by using existing equipment and conducting the necessary substitute path signaling using common channel signaling protocols such as TCAP and SS7 protocols. A feature of the arrangement is that an entirely different access path or route is provided to change switch translations without being limited by the geographic boundaries of the current conventional systems. In actuality, the new system allows access to all offices throughout the PSTN. A still further advantage is that the AIN network provides a high level of redundancy.

According to the invention the failure results in triggering a common channel signaling inquiry to a Signaling Control Point (SCP) which responds with instructions for setting up a common channel signaling link between the Recent Change Memory Administration Center (RCMAC) to an alternate Remote Memory Administration System (RMAS). The RCMAC then delivers the recent change message to the alternate RMAS and the RMAS delivers the recent change signal to the addressed switch. In an alternate embodiment the Signal Control Point (SCP) is provided with RMAS capability. This RMAS capability is then used in place of the alternate RMAS and the ISCP sets up a path from the SCP associated RMAS to the RCMAC and to the addressed switch. The communication from the RCMAC to the SCP and RMAS associated therewith is in common channel signaling protocol. The signal from the SCP associated RMAS to the addressed switch may be either in recent change protocol or common channel signaling protocol. In the latter instance the addressed switch is provided with protocol conversion capability to convert the CCS protocol to recent change protocol to effect the switch translation.

BEST MODE FOR CARRYING OUT THE INVENTION

One system for providing a Common Channel Signaling Network (CCSN) utilizes Signaling System 7 (SS7) protocol in a Packet Switched Data Network (PSDN) connecting Network Elements (NE) via packet switched 56 Kb digital data circuits. In addition to providing call set signaling functions, the SS7 network also provides access to switching control points (SCP's) used to permit line identification database (LIDB) look-up for 800 services. Class services also use the SS7 network to provide custom call features. The latest services using the SS7 network comprise Advanced Intelligent Network (AIN) services. AIN services use the SS7 network to access an Integrated Switching Control Point (ISCP) where AIN service functions are performed.

Figure 1:
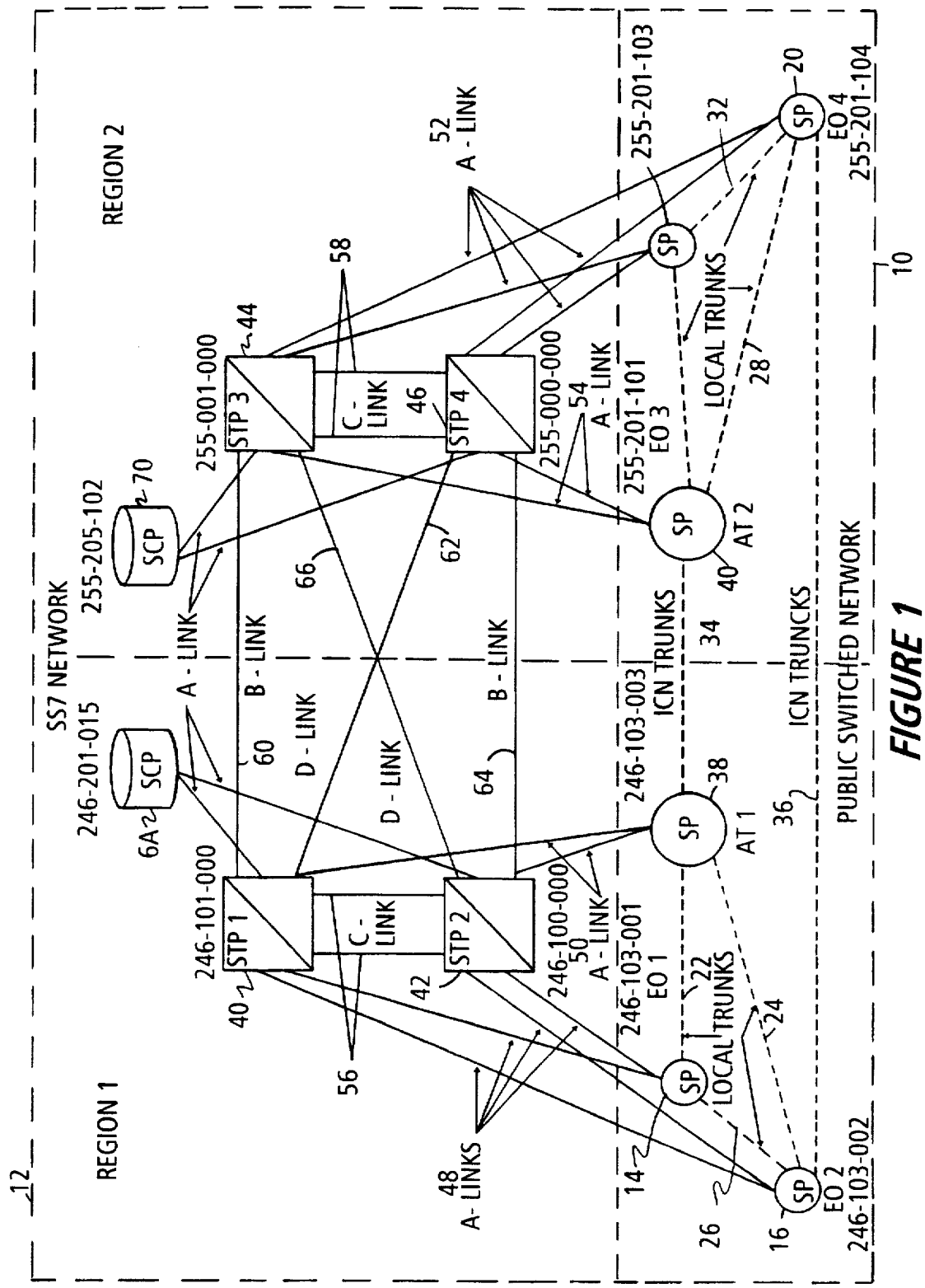
FIG. 1 is a block diagram of a Public Switched Telephone Network and its SS7 signal control network.

Referring to FIG. 1 there is shown a block diagram of a public switched telephone network and the SS7 network that is used to control the signaling for the switched network. An analog switched telephone network is generally indicated at 10 having a common channel signalling network in the form of an SS7 network illustrated generally at 12. The switched telephone network consists of a series of central offices which are conventionally referred to as signaling points (SP's or SSP's) in reference to the SS7 network. Certain of these SPs comprise end offices (EOs) illustrated at 14, 16, 18 and 20 as EOs 1–4 in FIG. 1. Each signaling point has a point code comprising a 9-digit code assigned to every node in the network. In FIG. 1 EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company, while end offices EO3 and EO4 represent end offices of the region of a different operating company. Each operating company has its own network ID, shown here as 246 for the left region and 255 for the right region in FIG. 1. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint. The broken lines connecting the SPs together may be analog trunks or voice or similar circuits. The SPs in a given region are connected together by local trunks 22, 24 and 26 in the left region and 28, 30 and 32 in the right region. The SPs in one region are connected to the SPs in other regions via inter-exchange carrier network trunks or ICN trunks 34 and 36 in FIG. 1 connected to Access Tandems (ATs) 38 and 40 (AT1 and AT2). These SPs or ATs are shown as having point codes 246-103-003 and 255-201-101 respectively.

Referring to FIG. 1, the SS7 network 12 comprises a series of Signal Transfer Points (STPs) shown here at 40, 42, 44 and 46 designated STP1, STP2, STP3 and STP4. Each STP in a network is connected to the SPs in the network by A links indicated at 48, 50, 52 and 54. STP1 and STP2 constitute a mated pair of STPs connected by C links 56 while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair cannot function without the C links. Therefore, unnecessary utilization of the C links causes congestion and prevents the paired STPs from performing their intended function.

The STPs are connected to Signal Control Points (SCPs) indicated in FIG. 1 as an SCP 68 and an ISCP 70. The ISCP is an Integrated Signaling Control Point, which is basically the same as an SCP but comprises a larger and more powerful computer. AIN may also be regarded as another ISCP. SCPs are usually used for 800 and credit card services with ISCPs being used for AIN. However, this is optional. The ISCP may hold application information as well as routing information whereas an SCP contains routing information, i.e., routing tables.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 62 to STP4 to EO4, and so forth. In the event that a link between STP3 and EO4 was lost, an SS7 route could be established from EO2 to EO4 via STP1 to STP3 and then via C link 58 to STP4 to EO4. However, that would be an undesirable route in unnecessarily using the C link. A links provide direct connectivity while C links provide circuitous routes using extra switches, a situation to be avoided. An alternate route would be from STP1 via D link 62 to STP4 to EO4. Another reason for not using the C link is to avoid tying up the entire STP3–STP4 pair.

The operation of placing a call from EO2 to EO4 may be described as follows: The user at EO2 picks up his phone and dials the number that resides in EO4. The SP generates an Initial Address Message (IAM). This message would have the destination point code of EO4, namely, point code 255-201-104. It would have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to 255 or EO4. B and D links are available and STP1 would choose one of the two. Assuming that it chooses the B link to STP3, STP3 repeats the same procedure. It determines that the message is for 255 or EO4 and puts that message on the A link to EO4.

EO4 gets the IAM which has the called telephone number in it and determines whether or not the line is busy. If the line is not busy, EO4 generates an Address Complete Message (ACM) to indicate that it received the request for a call and that the number is not busy. That message is sent back by simply reversing the point codes. Now the destination point code is EO2 and the originating point code is EO4. The message goes back to EO2 to indicate that the IAM was received and processed. As soon as the phone is answered at EO4, EO4 sends an Answer Message (ANS) back to EO2 indicating that the phone at EO4 was picked up, and at that time the trunks are connected together. EO2 connects its user to that trunk and EO4 connects its user to that trunk so that communication is established. All such messaging may occur in about 600 milliseconds which would be average but not necessarily fast.

The foregoing constitutes the function of the STPs insofar as routing is concerned. The STPs look at a point code and if it is not for them they just pass it on via a route determined from translations and routing tables. The C link is the last route permitted and is not utilized unless no other route is available.

As opposed to the foregoing, where the point code was for EO4 and not STP1, the point code may be for STP1. One example of such a situation would be the case of an 800 call. The 800 number is a fictitious number which is associated with a POTS number in a database in the SCP. Thus if EO2 makes an 800 call to EO4 it is necessary to determine the real telephone number. EO2 launches a Switching Connection Control Park (SCCP) message, which is a database request. This point code has a destination point code of an alias which is the point code of STP1 and STP2. STP1 and STP2 have various point codes indicated in FIG. 1 as 246-100-000 and 246-101-000. They also have alias point codes that indicate that they have a function, to perform. Upon recognizing such a point code the STP does a data search and generates another SCP message to perform a database dip. This returns the real telephone number and the STP now has the destination point code of the real telephone number message. This is sent back to EO2. STP1 determines that this message is not for me but for EO2. The message is sent back down to EO2. EO2 now has a real telephone number and the system performs the IAM and ACM procedure all over again to set up the call. The only difference between a regular direct call and an 800 call is the necessity to perform the dip to obtain the real number first. This procedure takes about 1.3 seconds because of the additional operation. The STPs have various databases, such as the 800 database and the credit card database, and there is still a further database for AIN. It is these databases which are utilized for the purposes of the present invention.

The SS7 protocol describes how the signal messages are built and routed and provides for network management of the SS7 network itself. Thus if a link between EO4 and STP3 were to be lost, STP3 generates a transfer restricted message (TFR) to all nodes, i.e., all SPs connected to STP3, indicating that traffic is not to be sent to STP3 for EO4 because no route from STP3 to EO4 exists. If both A links to EO4 were down, EO4 would essentially be isolated and the STP pair STP3 STP4 would broadcast a transfer prohibited (TFP) message indicating that nothing should be sent to the pair for EO4.

In the transfer restricted situation it would be possible for STP3 to reach EO4 via the C link to STP4. This is a non-favored route but would be used in necessity. Handling such situations is the purpose of network managing messages. Congestion control or TFC accomplishes basically the same thing except that it constitutes a more sophisticated message limiting use of a circuit by stopping messages below a certain priority. Each message has a different priority. IAMs have a priority of 1 where ANS messages have a priority of 2.

Upon congestion occurring in the STP node for EO4 a new call could not be sent to EO4 because it constitutes a priority 1 message which is restricted because the congestion level is 2. Only priority 2 messages and higher would be permitted. If a call is already existing it could be answered or released. Releases have a priority of 2 to permit call completion. New calls could not be initiated until the congestion had been removed or lowered to congestion status 1 or 0.

The SS7 network constitutes a sophisticated network having a high predictability which is spelled out in the predetermined protocol. The SS7 messages traverse the network at all times. The messages themselves comprise digital serial messages of various length that come into the STP. The start of the message is identified by a flag which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bits or in octets. These octets represent the information carried by the message. The message contains both fixed and variable parameters. The Message Transport Part (MTP) of the SS7 message is always in the same place. The values change but the MTP is always in the same place.

Figures 2, 3:
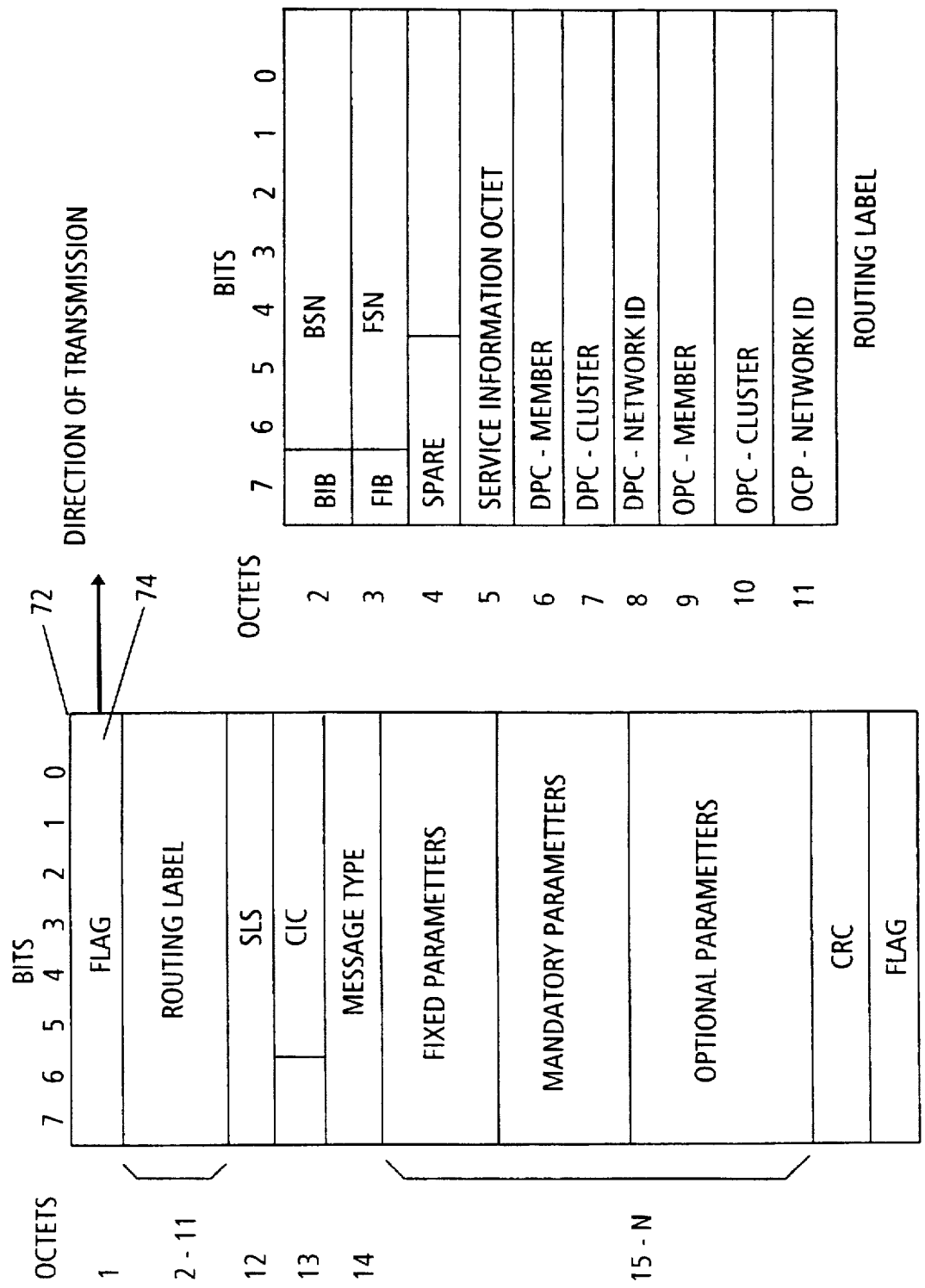
FIGS. 2 and 3 illustrate in graphic and tabular form respectively, the protocol of an SS7 data signal.

Referring to FIGS. 2 and 3, the start of a message is indicated at 72 with the commencement of the flag 74. The first 7 bits following the flag constitute the Backward Sequence Number (BSN). The eighth bit is the backward indicator bit which is used to track whether messages have been received correctly. The backward sequence number was the forward sequence of the other node's message when it was sent. Referring to FIG. 1, if EO2 sends a message to EO4, EO2s include a Forward Sequence Number (FSN) in the 3rd octet of its message. Upon receiving this message, EO4 will include a Backward Sequence Number (BSN) equal to the FSN sent in the previous message in its next message to EO2. This indicated to EO2 that EO4 received the first message. This constitutes a positive acknowledgment of receipt of a message. If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

EO2 sends a message with a FSN of 5 to EO4;

EO4 transmits a message back to EO2 with an inverted BIB and a BSN of 2, indicating that was the last message it received;

EO2 then inverts its FIB and retransmits message 3;

If EO4 acknowledges this message correctly (BSN of 3) EO2 will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are used for setting up calls or 800, LSSUs are used for alignment, and FISUs are fill in signals. Thus an LSSU is seen only if the link is out of service and going back into service or going out of service.

Octets 6–11 contain the point codes. Thus the point code 235-81-8198 is the point code which would be read in FIG. 3. This is backwards as it comes from the message which arrives number, cluster, network ID in the order of bits received. That constitutes the routing label telling the STP and the nodes where the message came from and where it is going. Other parameters are involved depending upon the kind of message. If this were a FISU, that would be it. There would be 16 other bits that have Cyclic Redundancy Codes (CRCs) in them and another flag which would constitute the end. CRCs constitute a further error detection code which is a legal 1 function in the protocol. From the foregoing it will be seen that the messages contain various fields. This describes the basic format of an SS7 message which is the same for all messages of the same type.

The SS7 protocol consists of four basic subprotocols:

Message Transfer Part (MTP), which provides functions for basic routing of signaling messages between signaling points.

Signaling Connection Control Part (SCCP), which provides additional routing and management functions for transfer of messages other than call set-up between signaling points.

Integrated Services Digital Network User Part (ISUP), which provides for transfer of call set-up signaling information between signaling points.

Transaction Capabilities Application Part (TCAP), which provides for transfer of non-circuit related information between signaling points.

Figure 4:
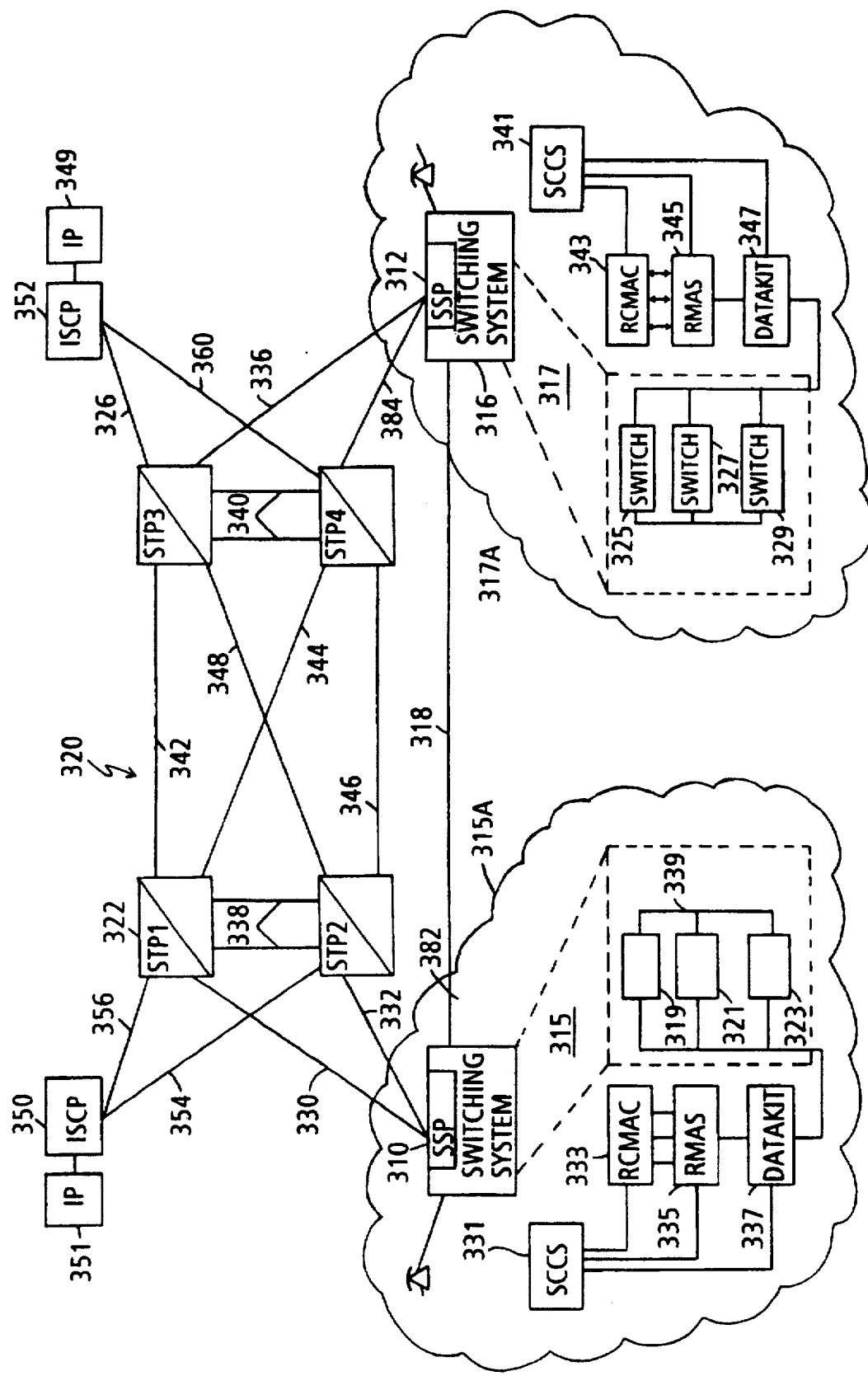
FIG. 4 shows a simplified diagram of a public switched telephone network for implementing the system and method of the invention.

Referring to FIG. 4 there is shown a simplified diagram of a public switched network such as described with more detail in connection with FIG. 1, but which also includes the features of the present invention. FIG. 4 shows two SSPs 310 and 312 which are associated with illustrative switches 314 and 316. The SSP equipped switches 314 and 316 are parts of switching systems or networks diagrammatically indicated at 315 and 317 and enclosed in clouds 315A and 317A. The network 315 includes other illustrative switches 319, 321, and 323, each of which includes SSP functionality. The network 317 includes illustrative switches 325, 327 and 329, which also include SSP functionality. The switch 314 represents a switch in the region of one regional operating company, while switch 316 represents a switch in the region of a different operating company. The SSP equipped switches in a given region are connected together by local trunks (not shown) and the switches 314 and 316 are connected via access tandems (not shown) and inter-exchange carrier network trunks such as the trunk 318 illustrated in FIG. 4.

The CCS or SS7 network, indicated generally at 320, includes a series of STP's 322, 324, 326 and 328 designated STP 1, STP 2, STP 3 and STP 4. Each STP is connected to the other STP's by A links indicated at 330, 332, 334 and 336. STP 1 and STP 2 constitute a mated pair of STP's connected by C links 338, each mated pair serving its respective transport area. STP 1 is connected to STP 3 by B link 342 and to STP 4 by D link 344. STP 2 is connected to STP 4 by B link 346 and by D link 348. The STP's are connected to ISCP's 350 and 352 by A links 354, 356, 358 and 360. The STPs are also connected to the SSP featured switches in their respective networks by A links 330, 332, 334 and 336.

Associated with the switching network 315 is a Recent Change Memory Administration Center (RCMAC) 333, Remote Memory Administrator System (RMAS) 335, and DataKit 337. Each of the foregoing is provided with SSP functionality. The RCMAC is linked to the RMAS by data links by which each terminal in the RCMAC may access the RMAS. The RCMAC is linked to the Service Order Processor (SOP) (not shown) which in essence is a business office. The RMAS is linked to the switches which it serves, for example, illustrative switches 319, 321 and 323 through the DataKit 337 and conventional data links. All switches are provided with SSP functionality and the SSP switches in the switching network 315 are linked by F links illustratively shown as 339. It will be understood that similar F links link all SSP switches in the network 315. Also, the RMAS, DataKit and SCCS possess SSP functionality and are linked to STPs in the CCS network 320 by A links similar to links 330 and 332 but not shown here for simplicity purposes.

In a similar fashion the right-most network 317 in the other regional system is associated with an SCCS 341, RCMAC 343, RMAS 345 and DataKit 347 connected to the illustrative switches 325, 327 and 329. The connections in this network are the same as those just described with respect to the network 315.

The operation of the system shown in FIG. 4 according to the invention may be as follows:

If an RCMAC technician at RCMAC 343 encounters an inability to communicate with his/her associated RMAS 345, the technician uses his terminal to trigger a TCAP message to the ISCP 352 over an A link, such as the links 334 and 336 and one or more intervening STPs. The TCAP message to the ISCP identifies the RMAS 345 where a fault has occurred and the switch to which the recent change message is addressed. The ISCP consults its database (makes a database dip) to identify an available RMAS which can contact the identified switch, such as the RMAS 335 in the next region, and frames a response which contains routing information to be implemented by the STPs and SSPs to complete a CCS or SS7 data link from the RCMAC 343 to the RMAS 335. This route is established via A links to the RMAS connected to the SCCS and through the CCS or SS7 network 320. It will be appreciated that this may be a virtual link.

Either the original trigger or the ISCP response also activates a first protocol converter to convert the recent change protocol ordinarily created by the RCMAC operator to TCAP or CCS protocol, and a second protocol converter to conversely convert CCS, SS7 or TCAP protocol back to Recent Change protocol. Such protocol conversion may simply constitute a software function activated respectively in the computer associated with the terminal of the originating RCMAC operator and the computer associated with the recipient RMAS. Once the CCS data link is completed between the RCMAC 343 through the CCS system 320 to the RMAS 335, the recent change message generated by RCMAC 343 is forwarded in CCS, SS7 or TCAP form. Upon receipt at RMAS 335 the TCAP protocol is converted in the computer in RMAS 335 back to recent change protocol which is then stored in RMAS 335 for delivery to the addressed switch at the time and in the manner specified in the received and stored message. The RMAS thus serves as a recent change signal storage and controller. The RMAS 335 may deliver the recent change translation message to the addressed switch through the DataKit 337 and CCS connection to the DataKit to the addressed switch. Conversion of the CCS, SS7 or TCAP message into the RMAS 335 back to recent change protocol may occur in the RMAS computer responsive to directions contained in the CCS, SS7 or TCAP message.

While the foregoing example of the operation utilizes an RMAS in another region, it will be appreciated by those skilled in the art that multiple RMASs frequently exist in the same LATA and that the ISCP in consulting its database may select the most convenient RMAS. Also, inasmuch as the CCS system may extend nationwide there is no reason why it is not virtually always possible to immediately provide alternate RMAS service upon RMAS breakdown. Such RMAS breakdown may be in the RMAS itself or within any of the links from the RMAS to the switch served by the RMAS.

According to another feature of the invention, the ISCP itself or an associated Intelligent Peripheral (IP) may furnish the alternate RMAS service. According to this embodiment of the invention the ISCP 352 may be provided with an intelligent peripheral (IP) 349 and the ISCP 350 may be provided with an intelligent peripheral 351. These peripherals constitute computers and storage which may be adjuncts to the ISCP or may be incorporated into the ISCP itself. According to this embodiment of the invention, the trigger from the RCMAC 343, instead of triggering the ISCP to establish a link to the RMAS 335, would establish a link between the RCMAC 343 and the IP 349 acting as an alternative RMAS. The recent change message in this instance is transmitted from the RCMAC 343 to the ISCP 352 and IP 349 in CCS, SS7 or TCAP protocol as described in the preceding embodiment. The IP 349 then originates a recent change message to the addressed switch through the CCS system 320 in the manner just described with respect to the preceding embodiment. This message may be in recent change protocol, as in the previously described embodiment, or may be in CCS, SS7 or TCAP protocol. If the message is in CCS, SS7 or TCAP protocol then the addressed switch is provided with CCS to recent change protocol conversion capability. An advantage in all of the embodiments according to the invention is the extreme redundancy provided in the CCS system. This affords a degree of reliability which does not exist using the conventional recent change switch translation system or method.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a switched communications network comprising:

a first central office switching system connected to subscriber lines including at least one service switching point for selectively providing switched communications between subscriber lines;

a second central office switching system connected to subscriber lines including at least one service switching point for selectively providing switched communications between subscriber lines;

a network controller arranged separately from said first and second central office switching systems and being connected to at least the service switching points connected to said central office switching systems through at least one service transfer point arranged to convey control data to effect communications, said network controller storing pre-programmed call processing data associated with subscribers who are associated with the subscriber lines connected to said first and second central office switching systems, a method comprising:

storing in said network controller information identifying recent change signal storages and controllers;

generating recent change signals and directing said signals to a recent change storage and controller;

upon the generation of said recent change signals encountering faulty processing of said recent change signals by said recent change storage and controller to which said signals were directed, sending an inquiry responsive to the faulty processing of said recent change signals to said network controller;

said network controller responding to said inquiry by causing said recent change signals to be forwarded to another recent change storage and controller identified by said network controller; and executing said recent change signals.

2. A method according to claim 1 wherein said recent change signals are forwarded to said another recent change storage and controller in common channel signaling protocol.

3. A method according to claim 2 wherein said recent change signals in common channel signaling protocol are converted from recent change protocol to common channel signaling protocol at the point from which they are forwarded and are reconverted back to recent change protocol at the point to which they are delivered.

4. A method according to claim 3 wherein the conversion from recent change protocol to common channel signal protocol occurs at a recent change memory administration center.

5. A method according to claim 4 wherein the conversion from common channel signal protocol to recent change protocol occurs at said another recent change storage and controller.

6. A method according to claim 1 including the steps of providing recent change storage and controller capability associated with the network controller, and performing the function of said another recent change storage and controller in the recent change storage and controller associated with the network controller.

7. A method according to claim 6 wherein said recent change storage and controller functionality is provided in an adjunct processor and storage associated with the network controller.

8. A method according to claim 6 wherein recent change signals are transmitted from said network controller in recent change message protocol.

9. A method according to claim 6 wherein recent change signals are transmitted from said network controller in common channel signal protocol.

10. A method according to claim 9 including the step of converting the recent change signals in common channel signaling protocol to recent change protocol at the switch to which said recent change signals are addressed.

11. A method according to claim 1 wherein said another recent change storage and controller is in a switching system of a local exchange company different than the local exchange company in whose switching system the recent change signal originated.

12. In a switched communications network comprising a plurality of service switching points, at least some of said service switching points being associated with subscriber lines, said service switching points associated with subscriber lines being connected by trunks for selectively providing switched communications between subscriber lines, a network controller arranged separately from the trunks and being connected to at least some of the service switching points through at least one service transfer point arranged to convey control data to effect communications, said network controller storing pre-programmed call processing data associated with subscribers who are associated with the subscriber lines, a first of said service switching points being connected to a first recent change storage and controller and a second of said service switching points being connected to a second recent change storage to controller, a method comprising:

storing in said network controller information identifying said first and second recent change signal storages and controllers;

generating recent change signals at a site in said network and directing said signals to said first recent change storage and controller;

upon said generated recent change signals encountering faulty processing in securing processing of said recent change signals by said first recent change storage and controller, sending an inquiry from said site in said network to said network controller;

said network controller responding to said inquiry by identifying said second recent change storage and controller and causing said recent change signals to be forwarded to said second recent change storage and controller; and executing said recent change signals.

13. A method according to claim 12 wherein said said recent change signals are forwarded to said second recent change storage and controller in common channel signaling protocol.

14. A method according to claim 13 wherein said recent change signals in common channel signaling protocol are converted from recent change protocol to common channel signaling protocol at the point from which they are forwarded and are reconverted back to recent change protocol at said second recent change storage and controller.

15. A method according to claim 14 wherein the conversion from recent change protocol to common channel signal protocol occurs at a recent change memory administration center.

16. A method according to claim 12 including the steps of providing recent change storage and controller capability associated with the network controller, and performing the function of said second recent change storage and controller in the recent change storage and controller associated with the network controller.

17. A method according to claim 16 wherein said recent change storage and controller functionality is provided in an adjunct processor and storage associated with the network controller.

18. A method according to claim 16 wherein recent change signals are transmitted from said network controller is recent change message protocol.

19. A method according to claim 16 wherein recent change signals are transmitted from said network controller in common channel signal protocol.

20. A method according to claim 19 including the step of converting the recent change message in common channel signaling protocol to recent change protocol at a service switching point.

21. A method according to claim 12 wherein said second recent change storage and controller is in a switching system of a local exchange company different than the local exchange company in whose switching system the recent change signal originated.

22. In a switched communications network comprising:

a first central office switching system connected to subscriber lines including at least one service switching point for selectively providing switched communications between subscriber lines;

a second central office switching system connected to subscriber lines including at least one service switching point for selectively providing switched communications between subscriber lines;

at least two recent change centers for inputting recent change signals to processor terminals and outputting processed signals from said processor terminals for delivery to recent change storages and controllers, said recent change storages and controllers including service switching points; a network controller arranged separately from the central office switching systems and being connected through at least one switching transfer point to at least the service switching points included in said recent change storages and controllers and being connected through at least one switching transfer point to the service switching point in said first and second central office switching systems to convey control data to effect communications, said network controller storing pre-programmed call processing data associated with subscribers who are associated with the subscriber lines connected to said first and second central office switching systems, a method comprising;

outputting said recent change signals from one of said recent change centers and directing said signals to one of said recent change storages and controllers;

upon said outputted recent change signals encountering in attempting to reach said one of said recent change storages and controllers, sending an inquiry from said one recent change center to said network controller;

causing said network controller to respond to said inquiry by identifying a recent change storage controller other than said one recent change storage and controller and causing said recent change signals to be forwarded to said identified recent change storage and controller; and executing said recent change signals.

23. A method according to claim 22 wherein said message is forwarded to said identified recent change storage and controller in common channel signaling protocol.

24. A method according to claim 23 wherein said recent change signals in common channel signaling protocol are converted from recent change protocol to common channel signaling protocol at the point from which they are forwarded and are reconverted back to recent change protocol at the point to which they are delivered.

25. A method according to claim 24 wherein the conversion from recent change protocol to common channel signal protocol occurs at a recent change center.

26. A method according to claim 25 wherein the conversion from common channel signal protocol to recent change protocol occurs at said identified recent change storage and controller.

27. A method according to claim 22 including the steps of providing recent change storage and controller capability associated with the network controller, and performing the function of said identified recent change storage and controller in the recent change storage and controller associated with the network controller.

28. A method according to claim 27 wherein said recent change storage and controller functionality is provided in an adjunct processor and storage associated with the network controller.

29. A method according to claim 22 wherein said identified recent change storage and controller is in a switching system of a local exchange company different than the local exchange company in whose switching system the recent change signal originated.

30. In a switched telecommunications network including multiple switching systems connected by trunks and controlled by a network controller arranged separately from the switching systems, wherein the network includes terminals for generating recent change signals and also includes recent change storages and controllers for storing and controlling recent change signals originated by said terminals, a method comprising the steps of:

generating a recent change signal at one of said terminals and attempting to transmit said recent change signal to one of said recent change storages and controllers for processing thereby;

responding to faulty said processing of said recent change signal by said one of said recent change storages and controllers by sending an inquiry signal to said network controller from the terminal which generated said recent change signal:

said network controller responding to said inquiry signal by sending a response message including identification of an alternate recent change storage and controller; and responsive to said message from said network controller transmitting said recent change signal to said alternate recent change storage and controller identified by said network controller.

* * * * *